US011996231B2

(12) United States Patent
Hirayama et al.

(10) Patent No.: US 11,996,231 B2
(45) Date of Patent: May 28, 2024

(54) LAMINATED CORE AND ELECTRIC MOTOR

(71) Applicant: NIPPON STEEL CORPORATION, Tokyo (JP)

(72) Inventors: Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 323 days.

(21) Appl. No.: 17/311,425

(22) PCT Filed: Dec. 17, 2019

(86) PCT No.: PCT/JP2019/049285
§ 371 (c)(1),
(2) Date: Jun. 7, 2021

(87) PCT Pub. No.: WO2020/129936
PCT Pub. Date: Jun. 25, 2020

(65) Prior Publication Data
US 2022/0028607 A1    Jan. 27, 2022

(30) Foreign Application Priority Data

Dec. 17, 2018  (JP) ................................. 2018-235858

(51) Int. Cl.
*H01F 41/02*      (2006.01)
*H01F 27/245*    (2006.01)
(Continued)

(52) U.S. Cl.
CPC ....... *H01F 41/0233* (2013.01); *H01F 27/245* (2013.01); *H02K 1/16* (2013.01);
(Continued)

(58) Field of Classification Search
CPC ....... H02K 1/18; H02K 1/185; H02K 2201/09
(Continued)

(56) References Cited

U.S. PATENT DOCUMENTS

| 3,386,058 A | 5/1968 | Michel |
| 4,025,379 A | 5/1977 | Whetstone |

(Continued)

FOREIGN PATENT DOCUMENTS

| CN | 102792556 A | 11/2012 |
| EP | 3553799 A1 | 10/2019 |

(Continued)

OTHER PUBLICATIONS

Machine translation of JP-2012061820-A (Year: 2012).*

(Continued)

*Primary Examiner* — Daniel C Puentes
*Assistant Examiner* — Minki Chang
(74) *Attorney, Agent, or Firm* — Renner, Otto, Boisselle & Sklar, LLP

(57) ABSTRACT

A laminated core includes a plurality of electrical steel sheets stacked on each other, and an adhesion part which is provided between the electrical steel sheets adjacent to each other in a stacking direction and adheres the electrical steel sheets to each other, in which the electrical steel sheet include an annular core back part, and a plurality of tooth parts which extend from the core back part in a radial direction of the core back part and are disposed at intervals in a circumferential direction of the core back part, an adhesion region in which the adhesion part is provided is formed in the core back part of the electrical steel sheet, and the adhesion region extends in a direction along a magnetic flux passing through a region of the electrical steel sheet in contact with the adhesion region.

14 Claims, 10 Drawing Sheets

(51) Int. Cl.
*H02K 1/16* (2006.01)
*H02K 1/18* (2006.01)
*H01F 27/26* (2006.01)

(52) U.S. Cl.
CPC .............. *H02K 1/18* (2013.01); *H01F 27/26* (2013.01); *H02K 2201/09* (2013.01); *H02K 2213/03* (2013.01)

(58) Field of Classification Search
USPC .............................. 310/216.004–216.65, 216
See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A | 9/1993 | Kaneda et al. |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 8,015,691 | B2 | 9/2011 | Miyake |
| 8,580,217 | B2 | 11/2013 | Hipszki et al. |
| 8,581,468 | B2 | 11/2013 | Kudose et al. |
| 8,697,811 | B2 | 4/2014 | Kishi et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 10,340,754 | B2 | 7/2019 | Ogino et al. |
| 10,348,170 | B2 | 7/2019 | Izumi et al. |
| 10,476,321 | B2 | 11/2019 | Li et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2002/0163277 | A1 | 11/2002 | Miyake et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0024148 | A1 | 2/2007 | Maita et al. |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1* | 8/2009 | Miyake ................ H02K 15/022 310/216.058 |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 | 4/2015 | Blocher et al. |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352159 | A1 | 12/2016 | Li et al. |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2018/0030292 | A1 | 2/2018 | Gotou |
| 2018/0056629 | A1* | 3/2018 | Hamamura .......... H02K 15/024 |
| 2018/0159389 | A1 | 6/2018 | Nishikawa |
| 2018/0212482 | A1 | 7/2018 | Nigo |
| 2018/0295678 | A1 | 10/2018 | Okazaki et al. |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 62-009951 A | 1/1987 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012060773 A | 3/2012 |
| JP | 2012061820 A * | 3/2012 |

(56) References Cited

FOREIGN PATENT DOCUMENTS

| | | |
|---|---|---|
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| NO | 2020/129935 A1 | 6/2020 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Datasheet of Nylon 6, Cast (Year: N/A, Printed Jun. 28, 2023).*
Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.

* cited by examiner

LAMINATED CORE AND ELECTRIC MOTOR

TECHNICAL FIELD

The present invention relates to a laminated core and an electric motor.

Priority is claimed on Japanese Patent Application No. 2018-235858, filed Dec. 17, 2018, the content of which is incorporated herein by reference.

BACKGROUND ART

Conventionally, a laminated core as described in Patent Document 1 below is known. In this laminated core, electrical steel sheets adjacent to each other in the stacking direction are adhered by an adhesive layer.

CITATION LIST

Patent Document

[Patent Document 1]
Japanese Unexamined Patent Application, First Publication No. 2011-023523

SUMMARY OF THE INVENTION

Problems to be Solved by the Invention

There is room for improvement in enhancing magnetic properties of the conventional laminated core.

The present invention has been made in view of the above circumstances, and an object thereof is to improve magnetic properties of a laminated core.

Means for Solving the Problem (1) An aspect of the present invention is a laminated core including a plurality of electrical steel sheets stacked on each other, and an adhesion part which is provided between the electrical steel sheets adjacent to each other in a stacking direction and adheres the electrical steel sheets to each other, in which the electrical steel sheet includes an annular core back part, and a plurality of tooth parts which extend from the core back part in a radial direction of the core back part and are disposed at intervals in a circumferential direction of the core back part, an adhesion region in which the adhesion part is provided is formed in the core back part of the electrical steel sheet, and the adhesion region extends in a direction along a magnetic flux passing through a region of the electrical steel sheet in contact with the adhesion region.

According to the above-described configuration, the adhesion part extends in one direction. An adhesion area of the adhesion part can be increased by forming the adhesion part to have a shape extending in one direction, and thus adhesion strength can be increased as compared with a case in which point-shaped adhesion regions are intermittently provided in the same range.

Generally, the adhesive shrinks upon curing. Therefore, a strain due to the curing shrinkage of the adhesive occurs in the adhesion region which is a region of the electrical steel sheet in contact with the adhesion part, and the iron loss of the electrical steel sheet increases in the region. Here, the region which is in contact with the adhesion region and in which the iron loss increases due to the strain is referred to as a deterioration region. According to the above-described configuration, a direction in which the adhesion region extends coincides with a direction along the magnetic flux passing through the deterioration region. Thus, a proportion of the deterioration region in a path cross-sectional area of the magnetic flux can be reduced, and the number of magnetic flux lines which passes through the deterioration region can be curbed. Further, the magnetic flux can easily bypass the deterioration region having high magnetic resistance by reducing the proportion of the deterioration region in the path cross-sectional area of the magnetic flux. As a result, it is possible to curb obstruction of a flow of the magnetic flux forming the magnetic circuit due to the deterioration region, and it is possible to enhance the magnetic properties of the laminated core as the stator core.

(2) In the laminated core according to (1), the core back part may have a first portion and a second portion which are alternately arranged in the circumferential direction, the first portion may be radially connected to the tooth part outside the tooth part in the radial direction, the second portion may be located between the first portions in the circumferential direction, and the adhesion region may be formed discretely in the circumferential direction at least one of the first portion and the second portion.

According to the above-described configuration, the adhesion region is discretely disposed in the circumferential direction in the core back part. Thus, the electrical steel sheets can be fixed to each other in a well-balanced manner. In addition, since the deterioration regions formed on the electrical steel sheet are disposed discretely, the deterioration regions are unlikely to obstruct the flow of the magnetic flux.

(3) In the laminated core according to (2), in the above-described laminated core, the adhesion region may be formed in the first portion, and the adhesion region may not be formed on both sides of the adhesion region in the circumferential direction.

According to the above-described configuration, regions (non-deterioration regions) in which the iron loss does not increase are provided on both sides of the deterioration region in the circumferential direction. Thus, the magnetic flux forming a magnetic circuit can bypass the non-deterioration region, and magnetic properties of the laminated core as the stator core can be improved.

(4) In the laminated core according to (3), in the above-described laminated core, the adhesion region may extend along a center line of the tooth part in the radial direction.

The magnetic flux which flows from the tooth part to the core back part extends in the radial direction at the first portion of the core back part, and branches to both sides in the circumferential direction at a middle of the first portion in the radial direction. According to the above-described configuration, since the adhesion region extends along the center line of the tooth part in the radial direction, the direction in which the adhesion region extends coincides with the direction in which the magnetic flux extends in the first portion. Therefore, it is possible to curb obstruction of the flow of magnetic flux due to the deterioration region, and it is possible to improve the magnetic properties of the stator core.

(5) In the laminated core according to (3) or (4), the tooth part may extend inward from the core back part in the radial direction, and the adhesion region may extend radially inward from an outer end of the core back part in the radial direction.

A path through which the magnetic flux flows tends to take the shortest distance with low magnetic resistance. According to the above-described configuration, since the adhesion region extends from the outer end of the core back part in the radial direction, it is difficult to obstruct the flow of magnetic flux passing through the shortest distance.

(6) In the laminated core according to (2), the adhesion region may be provided in the second portion, and the adhesion region may not be formed on both sides of the adhesion region in the radial direction.

According to the above-described configuration, the non-deterioration regions are provided on both sides of the deterioration region in the radial direction. Thus, the magnetic flux forming the magnetic circuit can bypass the non-deterioration region, and the magnetic properties of the laminated core as the stator core can be enhanced.

(7) In the laminated core according to (6), the adhesion region may extend in the circumferential direction.

The magnetic flux which flows through the core back part flows in the circumferential direction in the second portion. According to the above-described configuration, since the adhesion region extends in the circumferential direction, the deteriorated region is unlikely to obstruct the flow of the magnetic flux.

(8) In the laminated core according to (6) or (7), the tooth part may extend inward from the core back part in the radial direction, and the adhesion region may be unevenly disposed outward of the core back part in the radial direction.

According to the above-described configuration, since the adhesion region is unevenly disposed outward of the core back part in the radial direction, it is unlikely to obstruct the flow of magnetic flux passing through the shortest distance.

(9) In the laminated core according to (2), the adhesion region may be provided to straddle between one first portion and one second portion.

According to the above-described configuration, the adhesion region is formed asymmetrically with respect to the center line of the tooth portion. Thus, the magnetic flux densities are different between one side and the other side in the circumferential direction with respect to the tooth part. Such a laminated core can increase energy efficiency of the electric motor when it is used in an electric motor of which a rotation direction is limited to one direction.

(10) In the laminated core according to any one of (1) to (9), an average thickness of the adhesion part may be 1.0 μm to 3.0 μm.

(11) In the laminated core according to any one of (1) to (10), an average tensile modulus of elasticity E of the adhesion part may be 1500 MPa to 4500 MPa.

(12) In the laminated core according to any one of (1) to (11), the adhesion part may be a room temperature adhesion type acrylic-based adhesive containing SGA made of an elastomer-containing acrylic-based adhesive.

(13) An electric motor according to an aspect of the present invention is an electric motor including the laminated core according to any one of (1) to (12).

According to the electric motor having the above-described configuration, since it has a laminated core having excellent magnetic properties, an energy efficiency of the electric motor can be improved.

Effects of the Invention

According to the present invention, it is possible to enhance magnetic properties of a laminated core.

EMBODIMENTS FOR IMPLEMENTING THE INVENTION

Hereinafter, an electric motor according to an embodiment of the present invention will be described with reference to the drawings. In the embodiment, a motor, specifically an AC motor, more specifically a synchronous motor, and even more specifically, a permanent magnetic electric motor will be exemplified as the electric motor. This type of motor is suitably adopted for, for example, an electric vehicle.

Figure 1:
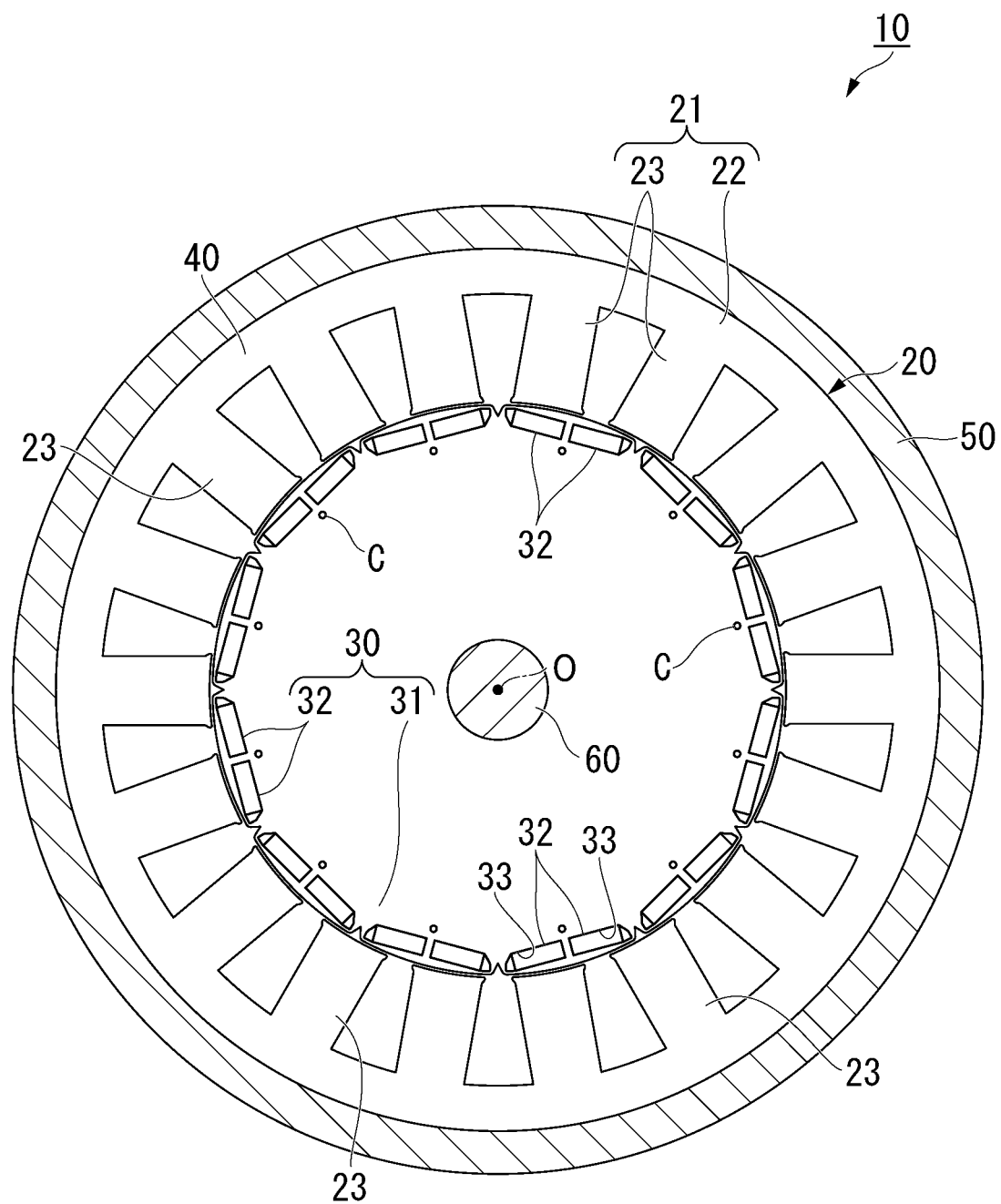
FIG. 1 is a cross-sectional view of an electric motor according to an embodiment of the present invention.
Figure 2:
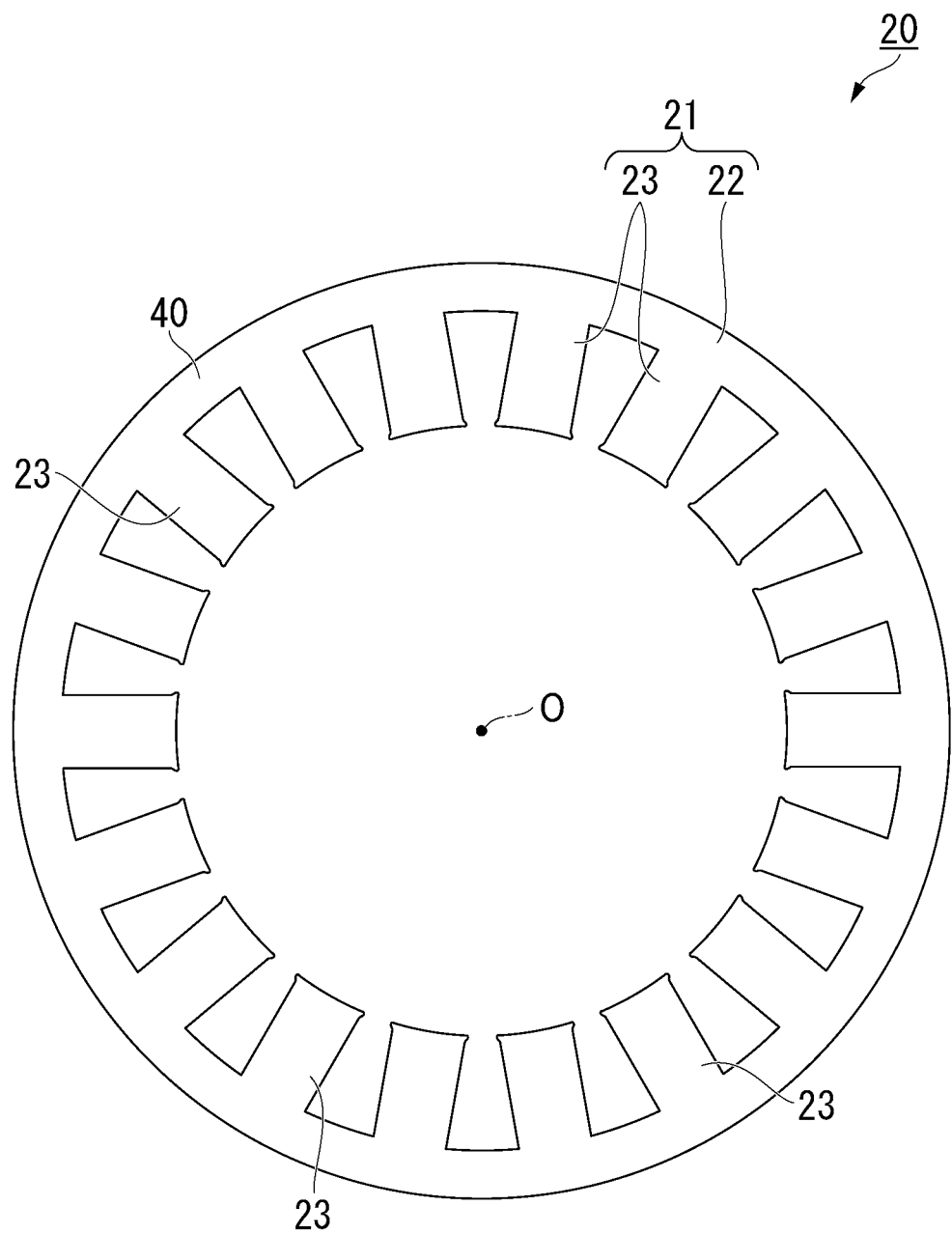
FIG. 2 is a plan view of a stator included in an electric motor shown in FIG. 1.

As shown in FIGS. 1 and 2, the electric motor 10 includes a stator 20, a rotor 30, a case 50, and a rotation shaft 60. The stator 20 and rotor 30 are accommodated in the case 50. The stator 20 is fixed to the case 50.

In the electric motor 10 of the present embodiment, for example, an excitation current having an effective value of 10 A and a frequency of 100 Hz is applied to each of the phases of the stator 20, and the rotor 30 and the rotation shaft 60 rotate at a rotation speed of 1000 rpm accordingly.

In the present embodiment, an inner rotor type in which the rotor 30 is located inside the stator 20 is adopted as the electric motor 10. However, an outer rotor type in which the rotor 30 is located outside the stator 20 may be adopted as the electric motor 10. Further, in the present embodiment, the electric motor 10 is a 12-pole 18-slot three-phase AC motor. However, for example, the number of poles, the number of slots, the number of phases, and the like can be changed as appropriate.

The stator 20 includes a stator core (a laminated core) 21 and a winding (not shown).

The stator core 21 includes an annular core back part 22 and a plurality of tooth parts 23. In the following, an axial direction (a direction of a central axis O of the stator core 21) of the stator core 21 (the core back part 22) is referred to as an axial direction, a radial direction (a direction orthogonal to the central axis O of the stator core 21) of the stator core 21 (the core back part 22) is referred to as a radial direction, and a circumferential direction (a direction of rotation around the central axis O of the stator core 21) of the stator core 21 (the core back part 22) is referred to as a circumferential direction.

The core back part 22 is formed in an annular shape in a plan view of the stator 20 when seen in the axial direction.

The plurality of tooth parts 23 extend from the core back part 22 inward in the radial direction (toward the central axis O of the core back part 22 in the radial direction). The plurality of tooth parts 23 are disposed at equal intervals in the circumferential direction. In the present embodiment, 18 tooth parts 23 are provided at an interval of 20 degrees of a central angle centered on the central axis O. The plurality of tooth parts 23 are formed to have the same shape and the same size as each other.

The winding is wound around the tooth part 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is formed in an annular shape (an annular ring shape) disposed coaxially with the stator 20. The rotation shaft 60 is disposed in the rotor core 31. The rotation shaft 60 is fixed to the rotor core 31.

The plurality of permanent magnets 32 are fixed to the rotor core 31. In the present embodiment, a set of two permanent magnets 32 forms one magnetic pole. The plurality of sets of permanent magnets 32 are disposed at equal intervals in the circumferential direction. In the present embodiment, 12 sets of (24 in total) permanent magnets 32 are provided at an interval of 30 degrees of the central angle centered on the central axis O.

In the present embodiment, an interior permanent magnet motor is adopted as a permanent magnetic electric motor. A plurality of through-holes 33 which pass through the rotor core 31 in the axial direction are formed in the rotor core 31. The plurality of through-holes 33 are provided corresponding to the plurality of permanent magnets 32. Each of the permanent magnets 32 is fixed to the rotor core 31 in a state in which it is disposed in the corresponding through-hole 33. Fixing of each of the permanent magnets 32 to the rotor core 31 can be realized, for example, by adhering an outer surface of the permanent magnet 32 and an inner surface of the through-hole 33 with an adhesive or the like. As the permanent magnetic electric motor, a surface permanent magnet motor may be adopted instead of the interior permanent magnet motor.

<Laminated Core>

Figure 3:
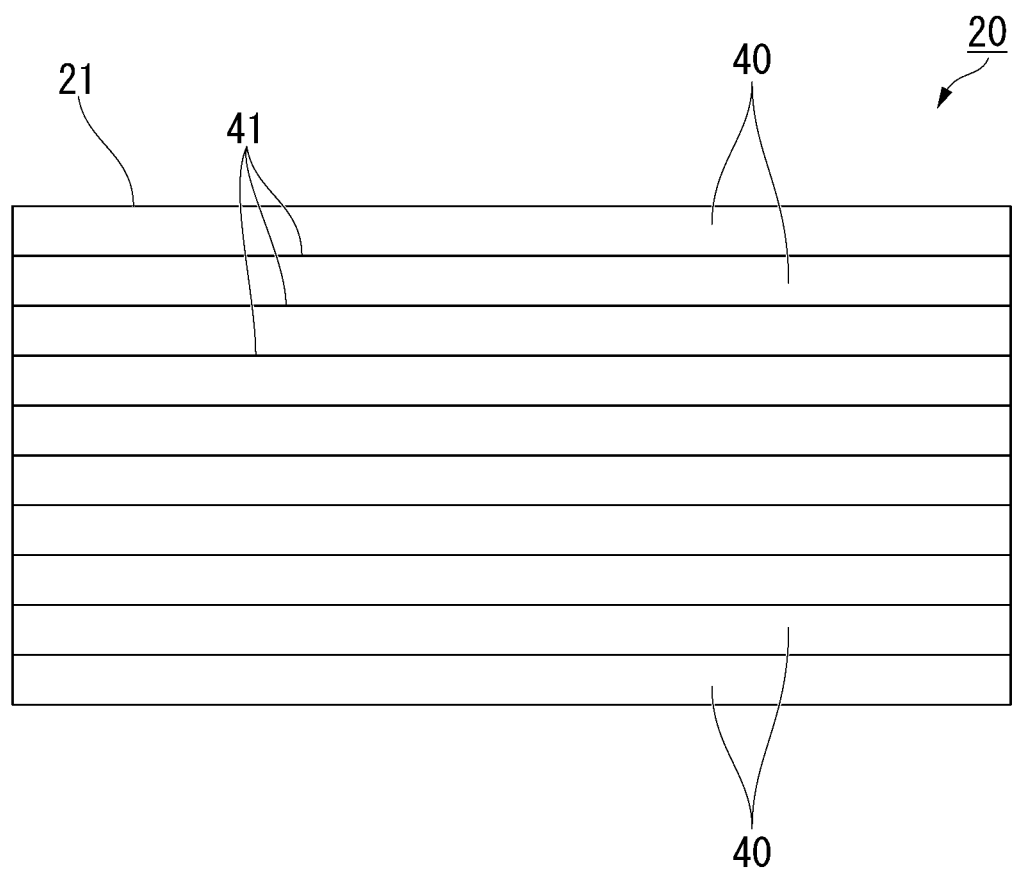
FIG. 3 is a front view of the stator included in the electric motor shown in FIG. 1.

As shown in FIG. 3, the stator core 21 is a laminated core. The stator core 21 is formed by stacking a plurality of electrical steel sheets 40. That is, the stator core 21 includes the plurality of electrical steel sheets 40 stacked in a thickness direction.

A stacked thickness of the stator core 21 is, for example, 50.0 mm. An outer diameter of the stator core 21 is, for example, 250.0 mm. An inner diameter of the stator core 21 is, for example, 165.0 mm. However, these values are examples, and the stacked thickness, and the outer diameter and the inner diameter of the stator core 21 are not limited to these values. Here, the inner diameter of the stator core 21 is based on a tip end portion of the tooth part 23 of the stator core 21. The inner diameter of the stator core 21 is a diameter of a virtual circle inscribed in the tip end portions of all the tooth parts 23.

Each of the electrical steel sheets 40 forming the stator core 21 and the rotor core 31 is formed, for example, by punching an electrical steel sheet as a base material. As the electrical steel sheet 40, a known electrical steel sheet can be used. A chemical composition of the electrical steel sheet 40 is not particularly limited. In the present embodiment, a non-grain-oriented electrical steel sheet is adopted as the electrical steel sheet 40. As the non-grain-oriented electrical steel sheet, for example, a non-grain-oriented electrical steel strip of JIS C 2552:2014 can be adopted.

However, as the electrical steel sheet 40, it is also possible to adopt a grain-oriented electrical steel sheet instead of the non-grain-oriented electrical steel sheet. As the grain-oriented electrical steel sheet, for example, a grain-oriented electrical steel strip of JIS C 2553:2012 can be adopted.

Insulation coatings are provided on both surfaces of the electrical steel sheet 40 in order to improve workability of the electrical steel sheet and iron loss of the laminated core. For example, (1) an inorganic compound, (2) an organic resin, (3) a mixture of an inorganic compound and an organic resin, and the like can be applied as a substance constituting the insulation coating. Examples of the inorganic compound include (1) a complex of dichromate and boric acid, (2) a complex of phosphate and silica, and the like. Examples of the organic resin include an epoxy-based resin, an acrylic-based resin, an acrylic-styrene-based resin, a polyester-based resin, a silicone-based resin, a fluorine-based resin, and the like.

In order to ensure insulating performance between the electrical steel sheets 40 stacked on each other, a thickness of the insulation coating (a thickness per one surface of the electrical steel sheet 40) is preferably 0.1 μm or more.

On the other hand, an insulating effect saturates as the insulation coating becomes thicker. Further, as the insulation coating becomes thicker, a proportion of the insulating film in the stator core 21 increases, and the magnetic properties of the stator core 21 deteriorate. Therefore, the insulation coating should be as thin as possible within a range in which the insulating performance is ensured. The thickness of the insulation coating (the thickness per one surface of the electrical steel sheet 40) is preferably 0.1 μm or more and 5 μm or less, and more preferably 0.1 μm or more and 2 μm or less.

As the electrical steel sheet 40 becomes thinner, an effect of improving the iron loss gradually saturates. Further, as the electrical steel sheet 40 becomes thinner, manufacturing cost of the electrical steel sheet 40 increases. Therefore, the thickness of the electrical steel sheet 40 is preferably 0.10 mm or more in consideration of the effect of improving the iron loss and the manufacturing cost.

On the other hand, when the electrical steel sheet 40 is too thick, a press punching operation of the electrical steel sheet 40 becomes difficult. Therefore, when considering the press punching operation of the electrical steel sheet 40, the thickness of the electrical steel sheet 40 is preferably 0.65 mm or less.

Further, as the electrical steel sheet 40 becomes thicker, the iron loss increases. Therefore, when considering iron loss characteristics of the electrical steel sheet 40, the thickness of the electrical steel sheet 40 is preferably 0.35 mm or less, more preferably 0.20 mm or 0.25 mm.

In consideration of the above points, the thickness of each of the electrical steel sheets 40 is, for example, 0.10 mm or more and 0.65 mm or less, preferably 0.10 mm or more and 0.35 mm or less, and more preferably 0.20 mm or 0.25 mm. The thickness of the electrical steel sheet 40 includes the thickness of the insulation coating.

The plurality of electrical steel sheets 40 forming the stator core 21 are adhered by an adhesion part 41. The adhesion part 41 is an adhesive which is provided between the electrical steel sheets 40 adjacent to each other in a stacking direction and is cured without being divided. As the adhesive, for example, a thermosetting adhesive by polymer bonding is used. As a composition of the adhesive, (1) an acrylic-based resin, (2) an epoxy-based resin, (3) a composition containing the acrylic-based resin and the epoxy-based resin, and the like can be applied. As such an adhesive, a radical polymerization type adhesive or the like can be used in addition to the thermosetting adhesive, and from the viewpoint of productivity, it is desirable to use a room temperature curing type adhesive. The room temperature curing type adhesive cures at 20° C. to 30° C. As the room temperature curing type adhesive, an acrylic-based adhesive is preferable. Typical acrylic-based adhesives include a second generation acrylic-based adhesive (SGA) and the like. An anaerobic adhesive, an instant adhesive, and an elastomer-containing acrylic-based adhesive can be used as long as the effects of the present invention are not impaired. The adhesive referred to here refers to a state before curing and becomes an adhesion part 41 after the adhesive is cured.

An average tensile modulus of elasticity E of the adhesion part 41 at room temperature (20° C. to 30° C.) is in a range of 1500 MPa to 4500 MPa. When the average tensile modulus of elasticity E of the adhesion part 41 is less than 1500 MPa, there is a problem that a rigidity of the laminated core is lowered. Therefore, a lower limit of the average tensile modulus of elasticity E of the adhesion part 41 is 1500 MPa, more preferably 1800 MPa. On the contrary, when the average tensile modulus of elasticity E of the adhesion part 41 exceeds 4500 MPa, there is a problem that the insulation coating formed on the surface of the electrical steel sheet 40 is peeled off. Therefore, an upper limit of the average tensile modulus of elasticity E of the adhesion part 41 is 4500 MPa, and more preferably 3650 MPa.

The average tensile modulus of elasticity E is measured by a resonance method. Specifically, the tensile modulus of elasticity is measured based on JIS R 1602:1995.

More specifically, first, a sample for measurement (not shown) is produced. This sample is obtained by adhering two electrical steel sheets 40 with an adhesive to be measured and curing the adhesive to form the adhesion part 41. When the adhesive is a thermosetting type, the curing is performed by heating and pressurizing under heating and pressurizing conditions in an actual operation. On the other hand, when the adhesive is a room temperature curing type, it is performed by pressurizing at room temperature.

Then, the tensile modulus of elasticity of this sample is measured by the resonance method. As described above, a method for measuring the tensile modulus of elasticity by the resonance method is performed based on JIS R 1602: 1995. After that, the tensile modulus of elasticity of the adhesion part 41 alone can be obtained by removing an influence of the electrical steel sheet 40 itself from the tensile modulus of elasticity (a measured value) of the sample by calculation.

Since the tensile modulus of elasticity obtained from the sample in this way is equal to an average value of all the laminated cores, this value is regarded as the average tensile modulus of elasticity E. The composition is set so that the average tensile modulus of elasticity E hardly changes at a stacking position in the stacking direction or at a circumferential position around an axial direction of the laminated core. Therefore, the average tensile modulus of elasticity E can be set to a value obtained by measuring the cured adhesion part 41 at an upper end position of the laminated core.

A motor generates heat when driven. Therefore, when a melting point of the adhesion part 41 is low, the adhesion part 41 melts due to the heat generated by the motor, a shape of an adhesion region 42 changes, and a desired effect cannot be obtained. Generally, an insulation coating (enamel) is provided on a surface of the winding wound around the stator core 21. A heatproof temperature of the coating is, for example, about 180° C. Therefore, a general motor is driven to be 180° C. or lower. That is, the motor can heat up to about 180° C. In the present embodiment, the melting point of the adhesion part 41 is preferably 180° C. or higher. Further, the melting point of the adhesion part 41 is more preferably 200° C. or higher in consideration of a safety factor in consideration of the fact that there is a portion in which the temperature is locally high.

As the adhering method, for example, a method of applying an adhesive to the electrical steel sheets 40 and then adhering them by one of heating and press-stacking, or both of them can be adopted. A heating means may be any one such as heating in a high temperature bath or an electric furnace, or a method of directly energizing.

In order to obtain stable and sufficient adhesion strength, the thickness of the adhesion part 41 is preferably 1 μm or more.

On the other hand, when the thickness of the adhesion part 41 exceeds 100 μm, an adhesion force is saturated. Further, as the adhesion part 41 becomes thicker, a space factor decreases, and the magnetic properties such as the iron loss of the laminated core decrease. Therefore, the thickness of the adhesion part 41 is preferably 1 μm or more and 100 μm or less, and more preferably 1 μm or more and 10 μm or less.

In the above description, the thickness of the adhesion part 41 means an average thickness of the adhesion part 41.

The average thickness of the adhesion part 41 is more preferably 1.0 μm or more and 3.0 μm or less. When the average thickness of the adhesion part 41 is less than 1.0 μm, sufficient adhesion force cannot be ensured as described above. Therefore, a lower limit of the average thickness of the adhesion part 41 is 1.0 μm, and more preferably 1.2 μm. On the contrary, when the average thickness of the adhesion part 41 becomes thicker than 3.0 μm, problems such as a large increase in a strain amount of the electrical steel sheet 40 due to a shrinkage during thermosetting occur. Therefore, an upper limit of the average thickness of the adhesion part 41 is 3.0 μm, and more preferably 2.6 μm.

The average thickness of the adhesion part 41 is an average value of all the laminated cores. An average thickness of the adhesion part 41 hardly changes at the stacking position in the stacking direction and a circumferential position around the central axis of the laminated core. Therefore, the average thickness of the adhesion part 41 can be set as an average value of numerical values measured at 10 or more points in the circumferential direction at an upper end position of the laminated core.

The average thickness of the adhesion part 41 can be adjusted, for example, by changing an amount of adhesive applied. Further, in the case of the thermosetting adhesive, the average tensile modulus of elasticity E of the adhesion part 41 may be adjusted, for example, by changing one or both of heating and pressurizing conditions applied at the time of adhesion and a type of curing agent.

Next, a relationship between the electrical steel sheet 40, the adhesion part 41, and the adhesion region 42 will be described with reference to FIG. 4.

Figure 4:
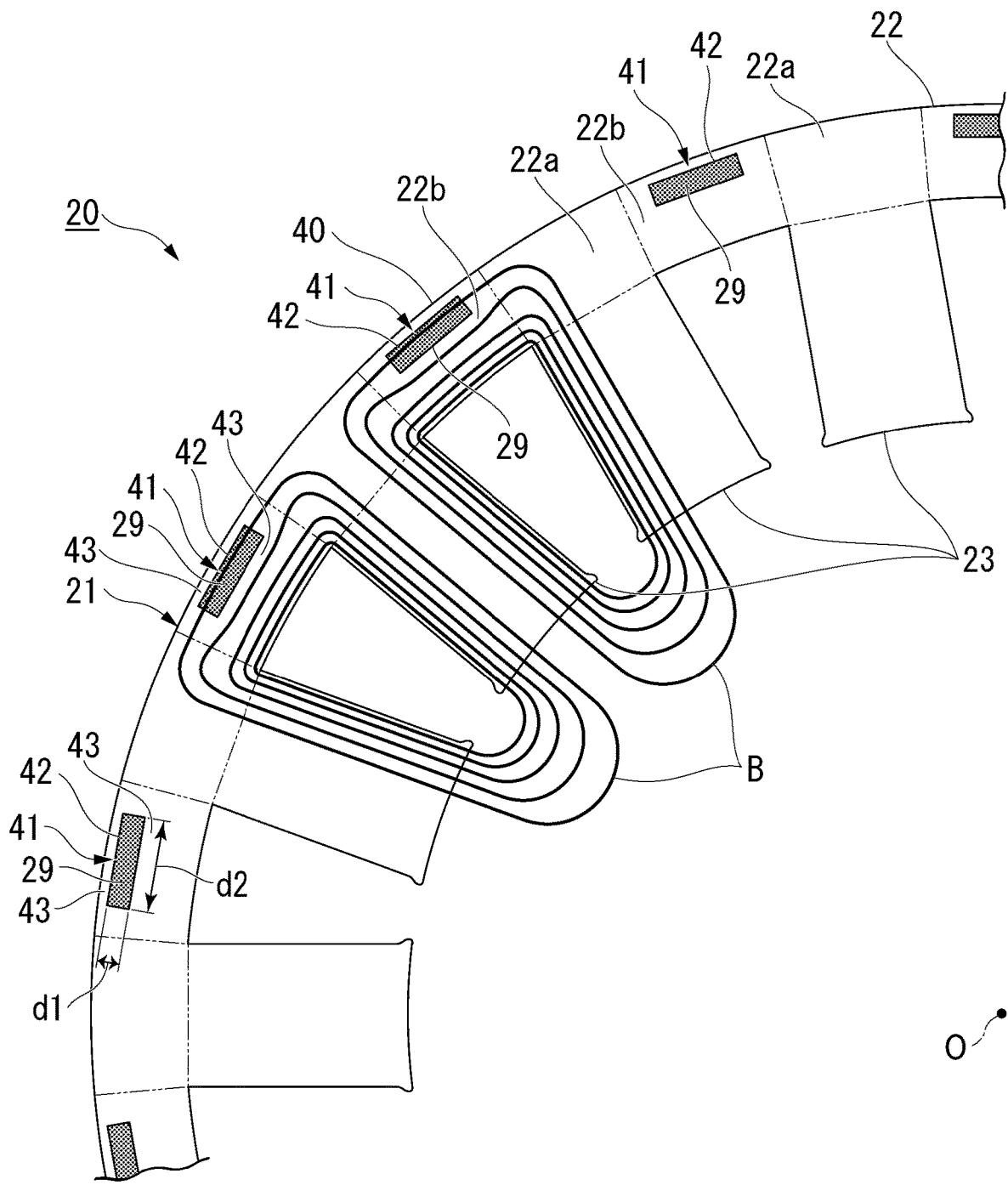
FIG. 4 is a schematic view of an electrical steel sheet and an adhesion region of the stator shown in FIGS. 2 and 3.

As shown in FIG. 4, electrical steel sheets 40 adjacent to each other in the stacking direction are not completely adhered to each other. The electrical steel sheets 40 are locally adhered to each other. The adhesion part 41 is provided on a plurality of core back parts 22 of the electrical steel sheet. The core back parts 22 are adhered by the adhesion part 41. That is, the plurality of electrical steel sheets 40 are adhered to each other by the adhesion part 41.

The adhesion region 42 and a blank region 43 (a non-adhesion region) are formed on a surface of the electrical steel sheet 40 which is directed in the stacking direction (hereinafter, referred to as a first surface of the electrical steel sheet 40). The adhesion region 42 is a region on the first surface of the electrical steel sheet 40 in which the adhesion part 41 is provided. More specifically, the adhesion region 42 is a region on the first surface of the electrical steel sheet 40 in which the cured adhesive is provided. The blank region 43 is a region on the first surface of the electrical steel sheet in which the adhesion part 41 is not provided.

Here, the core back part 22 of the electrical steel sheet 40 is divided into a first portion 22a and a second portion 22b. The first portion 22a and the second portion 22b are alternately arranged in the circumferential direction. That is, the core back part 22 has the first portions 22a and the second portions 22b which are alternately arranged in the circumferential direction. A boundary line between the first portion 22a and the second portion 22b extends linearly in the radial direction. The first portion 22a is connected to the tooth part 23 on the outer side of the tooth part 23 in the radial direction. The second portion 22b is located between the first portions 22a in the circumferential direction.

The adhesion region 42 is provided in the second portion 22b of the core back part 22. Further, the adhesion region 42 is not provided in the first portion 22a of the core back part 22. One adhesion region 42 is provided in one second portion 22b. The adhesion region 42 is located at a center of the second portion 22b in the circumferential direction. Further, the adhesion region 42 is unevenly disposed outward in the second portion 22b in the radial direction.

The adhesion region 42 has a substantially rectangular shape of which a long side direction is a direction orthogonal to the radial direction in a plan view. That is, the adhesion region 42 extends in the circumferential direction. According to the present embodiment, an adhesion area of the adhesion part 41 can be increased by forming the adhesion region 42 to have a shape extending in one direction, and thus the adhesion strength can be increased as compared with a case in which the point-shaped adhesion regions are intermittently provided in the same range.

The adhesion part can be easily formed in a manufacturing process by increasing a width dimension d1 of the adhesion part 41. Further, the electrical steel sheet 40 is not locally significantly distorted due to compressive stress of the adhesive, and deterioration of the iron loss of the electrical steel sheet 40 as a whole can be curbed by reducing the width dimension d1 of the adhesion part 41.

The width dimension of the adhesion region 42 is a dimension of the adhesion region 42 in a short side direction, and is a dimension of the adhesion region 42 in the radial direction in the present embodiment. In the present embodiment, since the adhesion region 42 is a region in which the adhesion part 41 is provided on the first surface of the electrical steel sheet 40, the width dimension of the adhesion region 42 and the width dimension of the adhesion part 41 are the same.

A ratio (d2/d1, an aspect ratio) of a longitudinal dimension d2 to the width dimension d1 of the adhesion region 42 is preferably 3.5 or more. It is possible to ensure the adhesion strength between the electrical steel sheets 40 while the distortion of the electrical steel sheets 40 is curbed by setting the aspect ratio of the adhesion region 42 to 3.5 or more.

In the present embodiment, the adhesive shrinks upon curing. Therefore, a strain due to the curing shrinkage of the adhesive occurs in a region of the electrical steel sheet 40 in contact with the adhesion part 41, and the iron loss of the electrical steel sheet 40 increases in the region. Here, the region which is in contact with the adhesion part 41 and in which the iron loss increases due to the strain is referred to as a deterioration region 29. The deterioration region 29 is a region which overlaps the adhesion region 42 when seen in the stacking direction. The deterioration region 29 has higher magnetic resistance than that of the other regions (non-deterioration regions).

In this specification, an increase in a value of the iron loss may be referred to as "deterioration of iron loss".

A magnetic flux B is formed on the electrical steel sheet 40 by a current flowing through the winding (not shown) of the stator 20. The magnetic flux B forms a magnetic circuit which passes through the tooth part 23 and the core back part 22. The magnetic flux B extends in the circumferential direction at the second portion 22b of the core back part 22.

According to the present embodiment, the adhesion region 42 is located at the second portion 22b and extends in the circumferential direction. That is, the direction in which the adhesion region 42 extends coincides with the direction in which the magnetic flux B extends in the second portion 22b. In other words, the adhesion region 42 extends in a direction along the magnetic flux B which passes through the deterioration region 29 of the electrical steel sheet 40 in contact with the adhesion region 42. Therefore, a proportion of the deterioration region 29 in a path cross-sectional area of the magnetic flux B can be reduced, and the number of magnetic flux lines which pass through the deterioration region 29 can be reduced. Further, the magnetic flux B can easily bypass the deterioration region 29 having high magnetic resistance by reducing the proportion of the deterioration region 29 in the path cross-sectional area of the magnetic flux. As a result, it is possible to curb obstruction of a flow of the magnetic flux B forming the magnetic circuit due to the deterioration region 29, and it is possible to enhance the magnetic properties of the stator core 21 as compared with a case in which the electrical steel sheets are fixed to each other by fastening.

As shown in FIG. 4, the blank region 43 in which the adhesion region 42 is not provided is provided outward from the adhesion region 42 in the radial direction and inward from the adhesion region 42 in the radial direction. That is, the adhesion regions 42 are not formed on either side of the adhesion region 42 in the circumferential direction. A region of the electrical steel sheet 40 which overlaps the blank region 43 is not subjected to stress due to the curing shrinkage of the adhesive. Therefore, the iron loss does not increase in this region as compared with the deterioration region 29. In the specification, a region of the electrical steel sheet 40 in which an increase in the iron loss does not occur is referred to as the non-deterioration region. According to the above-described configuration, since the non-deterioration regions are provided on both sides of the deterioration region 29 in the radial direction, the magnetic flux B forming the magnetic circuit can bypass the non-deterioration region, and thus the magnetic properties of the stator core 21 can be improved.

The magnetic flux B tends to flow along a shortest distance with lowest magnetic resistance. Therefore, in the core back part 22, a magnetic flux density decreases from the inner side in the radial direction to the outer side in the radial direction. In the present embodiment, the adhesion region 42 is disposed unevenly outward of the core back part 22 in the radial direction. Therefore, the deterioration region 29 of the electrical steel sheet 40 can be formed in a region having a low magnetic flux density, and the deterioration of the magnetic properties of the stator core 21 due to the provision of the adhesion part 41 can be curbed.

According to the present embodiment, the adhesion region 42 is provided in the second portion 22b and is not provided in the first portion 22a. Therefore, the adhesion region 42 is discretely disposed in the circumferential direction in the core back part 22. As a result, the electrical steel sheets 40 can be fixed to each other in a well-balanced manner. In addition, since the deterioration regions 29 formed on the electrical steel sheet 40 are disposed discretely, the deterioration regions 29 are unlikely to obstruct the flow of the magnetic flux B. Such an effect is an effect which can be obtained even when the adhesion region 42 is provided in the first portion 22a and is not provided in the second portion 22b. That is, the above-described effect can be obtained when the adhesion region 42 is provided discretely in the circumferential direction at least one of the first portion 22a and the second portion 22b.

In the present embodiment, like the stator core 21, the rotor core 31 is a laminated core. That is, the rotor core 31 includes a plurality of electrical steel sheets stacked in the thickness direction. In the present embodiment, the stacked thickness of the rotor core 31 is equal to that of the stator core 21 and is, for example, 50.0 mm. An outer diameter of the rotor core 31 is, for example, 163.0 mm. An inner diameter of the rotor core 31 is, for example, 30.0 mm. However, these values are examples, and the stacked thickness, the outer diameter, and the inner diameter of the rotor core 31 are not limited to these values.

In the present embodiment, the plurality of electrical steel sheets forming the rotor core 31 are fixed to each other by a fastening C (a dowel, refer to FIG. 1). However, the plurality of electrical steel sheets 40 forming the rotor core 31 may be adhered to each other by the same adhesion part as in the stator core 21.

Modified Example 1

Next, an adhesion part 141 and an adhesion region 142 of Modified example 1 which can be adopted in the above-described embodiment will be described with reference to FIG. 5. The components having the same aspects as those in the above-described embodiment are designated by the same reference numerals, and the description thereof will be omitted.

Similar to the above-described embodiment, the adhesion region 142 in which the adhesion part 141 is provided is formed in the core back part 22. The adhesion region 142 of the present modified example is provided in the first portion 22a of the core back part 22. Further, the adhesion region 142 is not provided in the second portion 22b of the core back part 22. One adhesion region 142 is provided in one first portion 22a. The adhesion region 142 is located at a center of the first portion 22a in the circumferential direction.

The adhesion region 142 has a substantially rectangular shape of which a long side direction is the radial direction in a plan view. The aspect ratio (d2/d1) of the adhesion region 142 is preferably 3.5 or more, as in the above-described embodiment.

The adhesion region 142 extends along a center line CL of the tooth part 23 in the radial direction. The center line CL is a virtual line which passes through the circumferential center of the tooth part 23 in the radial direction. An outer end portion of the adhesion region 142 in the radial direction is located at an outer end of the core back part 22 in the radial direction. That is, the adhesion region 142 extends radially inward from the outer end of the core back part 22 in the radial direction. Further, an inner end portion of the adhesion region 142 in the radial direction is located radially outward from the inner end of the core back part 22 in the radial direction.

The magnetic flux B is formed on the electrical steel sheet 40 by a current flowing through the winding (not shown) of the stator 20. The magnetic flux B forms a magnetic circuit which passes through the tooth part 23 and the core back part 22. The magnetic flux B extends in the radial direction at the first portion 22a of the core back part 22, and branches to both sides in the circumferential direction at a middle of the first portion 22a in the radial direction. The magnetic flux B branches in a symmetrical direction with respect to the center line CL of the tooth part 23.

According to the present modified example, the adhesion region 142 is located at the first portion 22a and extends along the center line CL of the tooth part 23 in the radial direction. That is, a direction in which the adhesion region 142 extends coincides with a direction in which at least a part of the magnetic flux B extends in the first portion 22a. In other words, the adhesion region 142 extends in a direction along at least a part of the magnetic flux passing through the deterioration region 129 of the electrical steel sheet 40 in contact with the adhesion region 142. Therefore, a proportion of the deterioration region 129 in the path cross-sectional area of the magnetic flux B can be reduced, and the number of magnetic flux lines passing through the deterioration region 129 can be curbed. Further, the magnetic flux B can easily bypass the deterioration region 129 having high magnetic resistance by reducing the proportion of the deterioration region 129 in the path cross-sectional area of the magnetic flux B. Further, in the present modified example, since the adhesion region 142 extends along the center line CL of the tooth part 23, the magnetic flux B branching in the symmetrical direction with respect to the center line CL can easily bypass the deterioration region 129. As a result, it is possible to curb the obstruction of the flow of the magnetic flux B forming the magnetic circuit due to the deterioration region 129, and it is possible to improve the magnetic properties of the stator core 21 as compared with a case in which the electrical steel sheets are fixed to each other by a fastening.

Figure 5:
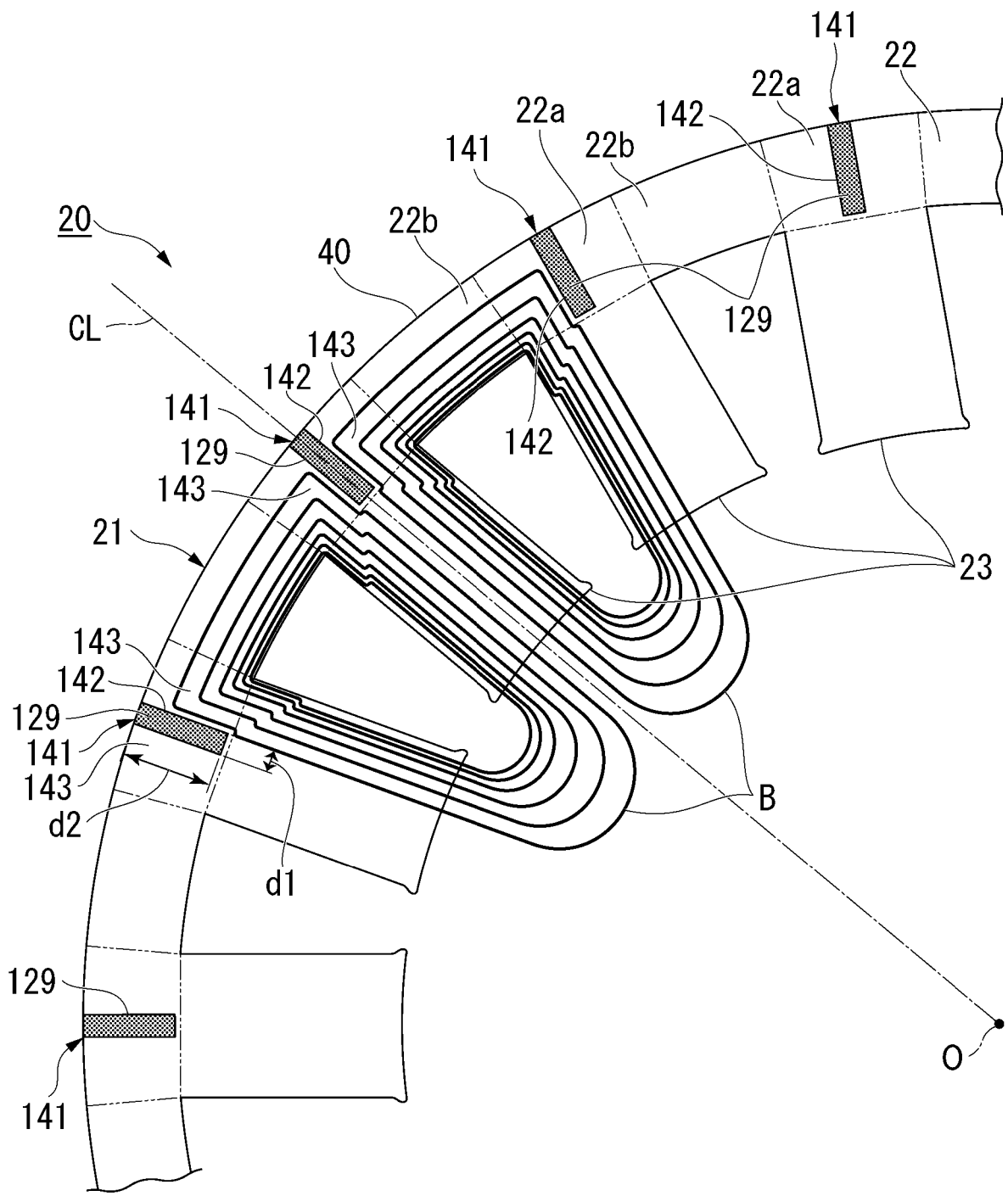
FIG. 5 is a schematic view of an adhesion region of a stator according to Modified example 1.

As shown in FIG. 5, blank regions 143 in which the adhesion region 142 is not provided are provided on both sides of the adhesion region 142 in the circumferential direction. The non-deterioration region in which stress due to curing shrinkage of the adhesive is not applied is formed in the region of the electrical steel sheet 40 which overlaps the blank region 143. According to the above-described configuration, since the non-deterioration regions are provided on both sides of the deterioration region 129 in the circumferential direction, the magnetic flux B forming the magnetic circuit can bypass the non-deterioration region, and the magnetic properties of the stator core 21 can be improved.

Since the magnetic flux B tends to flow along the shortest distance with low magnetic resistance, the magnetic flux density in the core back part 22 decreases from the inner side in the radial direction toward the outer side in the radial direction. In the present modified example, the adhesion region 142 extends from the outer end of the core back part 22 in the radial direction. Therefore, the deterioration region 129 of the electrical steel sheet 40 can be formed in a region having a low magnetic flux density, and the deterioration of the magnetic properties of the stator core 21 due to the provision of the adhesion region 142 can be curbed.

Modified Example 2

Next, an adhesion part 241 and an adhesion region 242 of Modified example 2 which can be adopted in the above-described embodiment will be described with reference to FIG. 6. The components having the same aspects as those in the above-described embodiment are designated by the same reference numerals, and the description thereof will be omitted.

Similar to the above-described embodiment, the adhesion region 242 in which the adhesion part 241 is provided is formed in the core back part 22. The adhesion region 242 of the present modified example is provided in the first portion 22a of the core back part 22. Further, the adhesion region 242 is not provided in the second portion 22b of the core back part 22. One adhesion region 242 is provided in one first portion 22a. The adhesion region 242 is located at a center of the first portion 22a in the circumferential direction. Further, the adhesion region 242 is unevenly disposed inward in the radial direction in the first portion 22a.

The adhesion region 242 has a substantially rectangular shape of which a long side direction is a direction orthogonal to the radial direction in a plan view. Further, the aspect ratio (d2/d1) of the adhesion region 242 is preferably 3.5 or more, as in the above-described embodiment.

The magnetic flux B is formed on the electrical steel sheet 40 by a current flowing through the winding (not shown) of the stator 20. The magnetic flux B forms a magnetic circuit which passes through the tooth part 23 and the core back part 22. The magnetic flux B extends in the radial direction at the first portion 22a of the core back part 22, and branches to both sides in the circumferential direction at a middle of the first portion 22a in the radial direction.

According to the present modified example, the adhesion region 242 is located at the first portion 22a and extends in the circumferential direction. That is, a direction in which the adhesion region 242 extends partially coincides with a direction of the magnetic flux B which branches at the first portion 22a and extends in the circumferential direction. In other words, at least a part of the adhesion region 242 extends in a direction along the magnetic flux B passing through the deterioration region 229 of the electrical steel sheet 40 in contact with the adhesion region 242. Therefore, the proportion of the deterioration region 229 in the path cross-sectional area of the magnetic flux B can be reduced, and also the magnetic flux B can easily bypass the deterioration region 229 having high magnetic resistance. As a result, it is possible to curb the obstruction of the flow of the magnetic flux B forming the magnetic circuit due to the deterioration region 229, and it is possible to improve the magnetic properties of the stator core 21 as compared with a case in which the electrical steel sheets are fixed to each other by a fastening.

Figure 6:
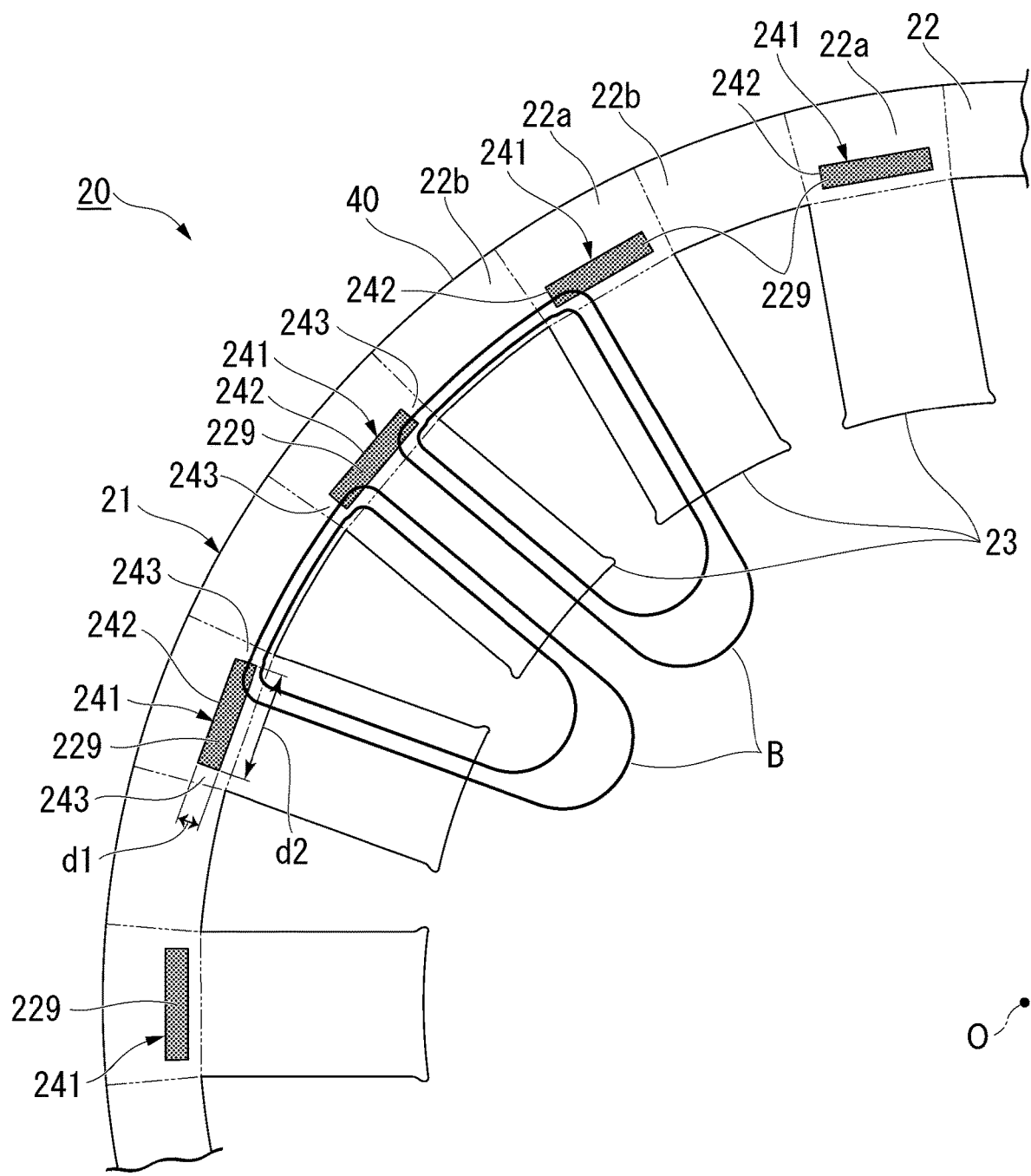
FIG. 6 is a schematic view of an adhesion region of a stator according to Modified example 2.

As shown in FIG. 6, blank regions 243 in which the adhesion region 242 is not provided are provided on both sides of the adhesion region 242 in the circumferential direction. In the region of the electrical steel sheet 40 which overlaps the blank region 243, the non-deterioration region to which stress due to the curing shrinkage of the adhesive is not applied is not formed. According to the above-described configuration, since the non-deterioration regions are provided on both sides of the deterioration region 229 in the circumferential direction, the magnetic flux B forming the magnetic circuit can pass through the non-deterioration region, and the magnetic properties of the stator core 21 can be improved.

Modified Example 3

Figure 7:
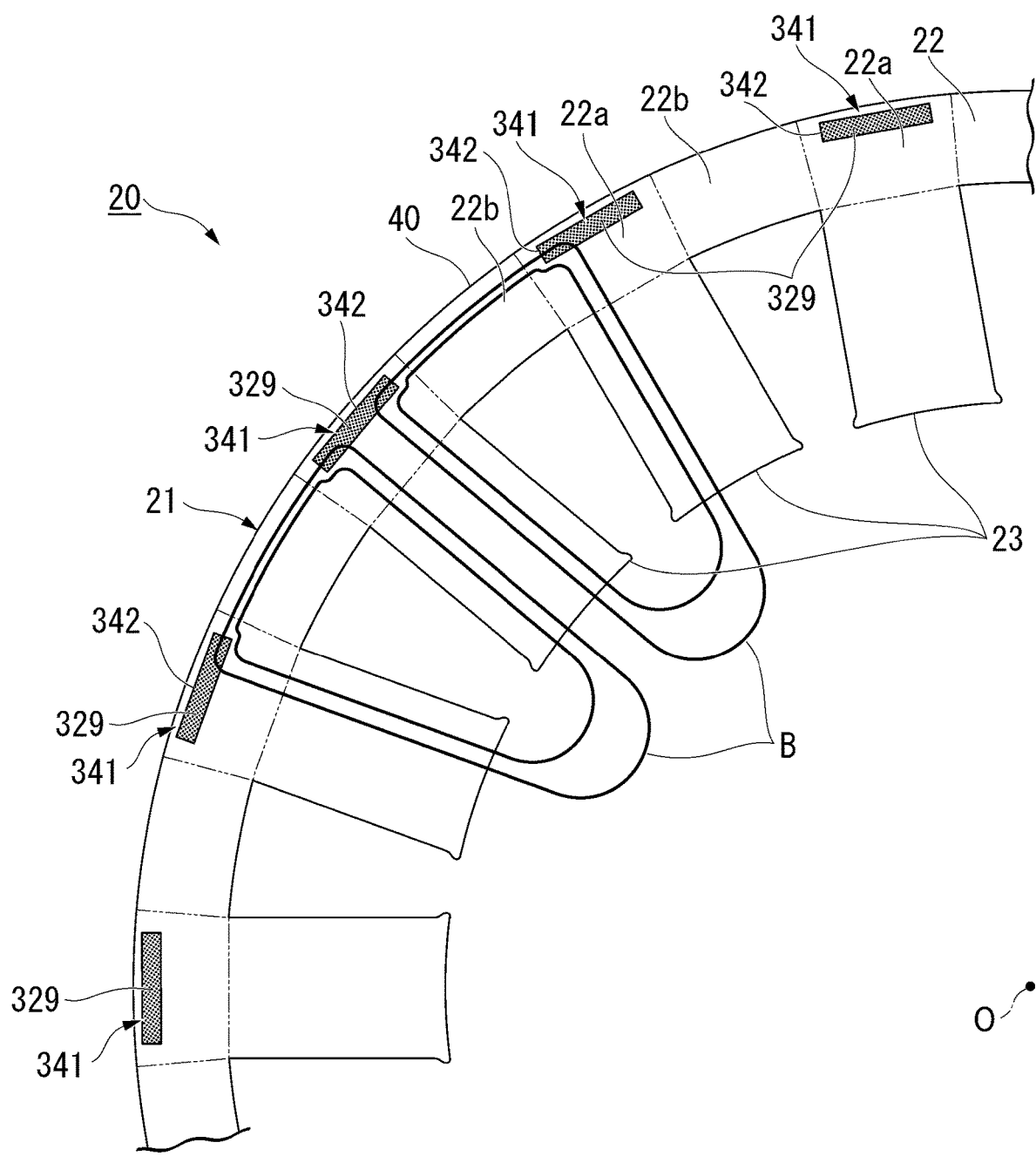
FIG. 7 is a schematic view of an adhesion region of a stator according to Modified example 3.

Next, an adhesion part 341 and an adhesion region 342 of Modified example 3 which can be adopted in the above-described embodiment will be described with reference to FIG. 7. The components having the same aspects as those in the above-described embodiment are designated by the same reference numerals, and the description thereof will be omitted.

Similar to the above-described embodiment, the adhesion region 342 in which the adhesion part 341 is provided is formed in the core back part 22. The adhesion region 342 of the present modified example is similar to the configuration of the adhesion region 242 of Modified example 2. The adhesion region 342 of the present modified example is different from the adhesion region 242 of the modified example 2 in that it is unevenly disposed outward of the first portion 22a in the radial direction.

Since the magnetic flux B tends to flow along the shortest distance with low magnetic resistance, the magnetic flux density of the core back part 22 decreases from the inner side in the radial direction toward the outer side in the radial direction. In the present modified example, the adhesion region 342 is disposed unevenly outward of the core back part 22 in the radial direction. Therefore, the deterioration region 329 of the electrical steel sheet 40 can be formed in a region having a low magnetic flux density, and the deterioration of the magnetic properties of the stator core 21 due to the provision of the adhesion region 342 can be curbed.

According to the present modified example, the adhesion region 342 is disposed unevenly outward of the first portion 22a in the radial direction and extends in the circumferential direction. Therefore, the adhesion region 342 more widely extends parallel to a direction of the magnetic flux B which branches at the first portion 22a and extends in the circumferential direction, as compared with the adhesion region 242 of Modified example 2. Therefore, not only the proportion of the deterioration region 329 in the path cross-sectional area of the magnetic flux B can be further reduced, but also the magnetic flux B can more easily bypass the deterioration region 329 having high magnetic resistance. As a result, it is possible to curb the obstruction of the flow of the magnetic flux B forming the magnetic circuit due to the deterioration region 329, and it is possible to further enhance the magnetic properties of the stator core 21 as compared with Modified example 2.

Modified Example 4

Figure 8:
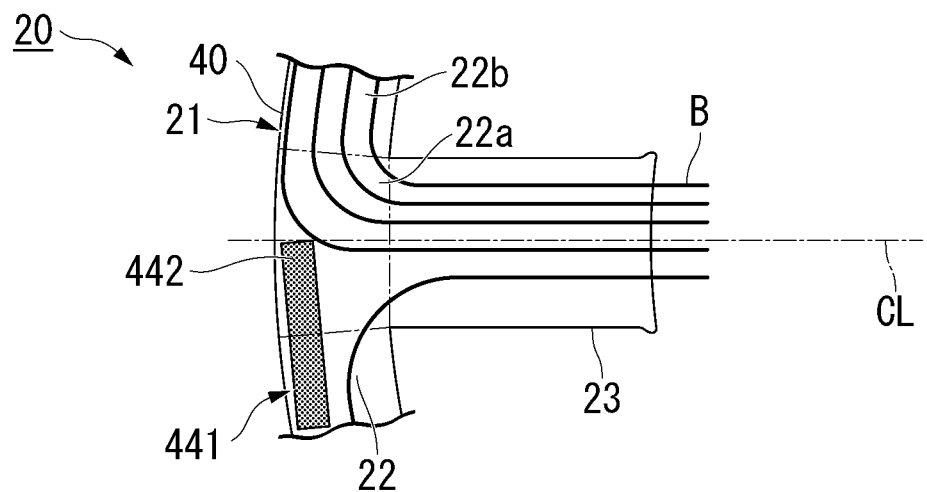
FIG. 8 is a schematic view of an adhesion region of a stator according to Modified example 4.

Next, an adhesion part 441 and an adhesion region 442 of Modified example 4 which can be adopted in the above-described embodiment will be described with reference to FIG. 8. The components having the same aspects as those in the above-described embodiment are designated by the same reference numerals, and the description thereof will be omitted.

Similar to the above-described embodiment, the adhesion region 442 in which the adhesion part 441 is provided is formed in the core back part 22. The adhesion region 442 of the present modified example is provided to straddle between one first portion 22a and one second portion 22b. Further, the adhesion region 442 of the present modified example is unevenly disposed outward of the core back part 22 in the radial direction, and extends in the circumferential direction.

In the present modified example, the adhesion region 442 is provided on a boundary line between one first portion 22a and the second portion 22b on one side in the circumferential direction, and is not provided on a boundary line between the first portion 22a and the second portion 22b on the other side in the circumferential direction. Therefore, the adhesion region 442 is formed asymmetrically with respect to the center line CL of the tooth part 23. A density of the magnetic flux B flowing from the tooth part 23 to the core back part 22 is more likely to increase on the other side in the circumferential direction in which the adhesion region 442 is not provided than on one side in the circumferential direction in which the adhesion region 442 is provided. That is, according to the present embodiment, the magnetic flux densities are different between one side and the other side in the circumferential direction with respect to the center line CL. Such a laminated core can increase energy efficiency of the electric motor when it is used in an electric motor of which a rotation direction is limited to one direction.

Modified Example 5

Figure 9:
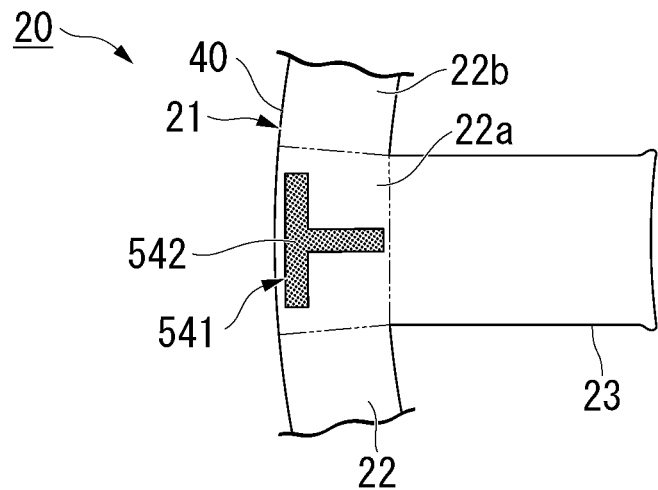
FIG. 9 is a schematic view of an adhesion region of a stator according to Modified example 5.

Next, an adhesion part 541 and an adhesion region 542 of Modified example 5 which can be adopted in the above-described embodiment will be described with reference to FIG. 9. The components having the same aspects as those in the above-described embodiment are designated by the same reference numerals, and the description thereof will be omitted.

Similar to the above-described embodiment, the adhesion region 542 in which the adhesion part 541 is provided is formed in the core back part 22. The adhesion region 542 of the present modified example has a T shape in a plan view, and can be considered to be a combination of the adhesion region 142 of Modified example 1 and the adhesion region 342 of Modified example 3. According to the present modified example, the effects of Modified examples 1 and Modified example 3 can be exhibited, a sufficient area of the adhesion region 542 can be ensured, and the adhesion strength can be increased. As shown in the present modified example, a configuration which combines the configurations of the embodiment and each of the modified examples may be adopted to obtain the combined effects.

The technical scope of the present invention is not limited to the above-described embodiment and the modified examples thereof, and various modifications can be made without departing from the purpose of the present invention.

In the stator cores of the above-described embodiment and the modified examples thereof, the plurality of electrical steel sheets are fixed to each other in the adhesion region provided in the core back part. However, the electrical steel sheets may be fixed to each other not only in the core back part but also in the tooth part. In this case, a fastening may be provided in the tooth part, or a separate adhesion region may be provided on the tooth part. Further, the electrical steel sheets may be welded and fixed to each other in addition to the adhesion fixing due to the adhesion region.

In the above-described embodiment and the modified examples thereof, the case in which the width dimension of the adhesion region is uniform throughout the total length of the adhesion region has been described. However, the width dimension of the adhesion region does not necessarily have to be uniform. As an example, both end portions of the adhesion region in the width direction may be winding and may extend in a lengthwise direction.

The shape of the stator core is not limited to the form shown in the above-described embodiment. Specifically, dimensions of the outer diameter and the inner diameter of the stator core, the stacked thickness, the number of slots, the dimensional ratio of the tooth part in the circumferential direction and the radial direction, the dimensional ratio of the tooth part and the core back part in radial direction, and the like can be arbitrarily designed according to the desired characteristics of the electric motor.

In the rotor of the above-described embodiment, although a set of two permanent magnets 32 forms one magnetic pole, the present invention is not limited thereto. For example, one permanent magnet 32 may form one magnetic pole, or three or more permanent magnets 32 may form one magnetic pole.

In the above-described embodiment, although the permanent magnetic electric motor has been described as an example of the electric motor, the structure of the electric motor is not limited thereto as exemplified below, and various known structures not exemplified below can also be adopted.

In the above-described embodiment, although the permanent magnetic electric motor has been described as an example of the synchronous motor, the present invention is not limited thereto. For example, the electric motor may be a reluctance motor or an electromagnet field motor (a wound-field motor).

In the above-described embodiment, although the synchronous motor has been described as an example of the AC motor, the present invention is not limited thereto. For example, the electric motor may be an induction motor.

In the above-described embodiment, although the AC motor has been described as an example of the electric motor, the present invention is not limited thereto. For example, the electric motor may be a DC motor.

In the above-described embodiment, although the motor has been described as an example of the electric motor, the present invention is not limited thereto. For example, the electric motor may be a generator.

In the above-described embodiment, although the case in which the laminated core according to the present invention is applied to the stator core is exemplified, it can also be applied to the rotor core.

In addition, it is possible to replace the components in the above-described embodiment and the modified examples thereof with well-known components as appropriate without departing from the purpose of the present invention, and the above-described modified examples may be appropriately combined.

Example

A verification test was conducted to verify the suppression of deterioration of the iron loss of the electrical steel sheets due to the compressive stress of the adhesion part. This verification test was carried out by simulation using software. As the software, an electromagnetic field simulation software based on finite element method JMAG manufactured by JSOL Corporation was used. As a model used for the simulation, the stator cores (the laminated cores) of Model No. 1 to Model No. 4 was assumed. The electrical steel sheet used for each of the models was made by punching a thin sheet having a thickness of 0.25 mm. The shape of the electrical steel sheet is the same as that shown in FIG. 2.

The stator cores of Model No. 1 to Model No. 3 are different from the stator core of No. 4 in the structure of fixing the electrical steel sheets. In the stator cores of Model No. 1 to Model No. 3, the adhesion part is provided between the electrical steel sheets, and the electrical steel sheets are adhered and fixed to each other. On the other hand, in the stator core of Model No. 4, the electrical steel sheets are fixed to each other by a fastening.

The adhesion part of Model No. 1 corresponds to the adhesion part 41 shown in FIG. 4. The adhesion region of the adhesion part of Model No. 1 extends in the circumferential direction at the second portion of the core back part.

The adhesion part of Model No. 2 corresponds to the adhesion part 141 shown in FIG. 5. The adhesion region of the adhesion part of Model No. 2 extends in the circumferential direction at the first portion of the core back part.

The adhesion part of Model No. 3 corresponds to the adhesion part 241 shown in FIG. 6. The adhesion region of the adhesion part of Model No. 3 extends in the circumferential direction at the first portion of the core back part.

Figure 11:
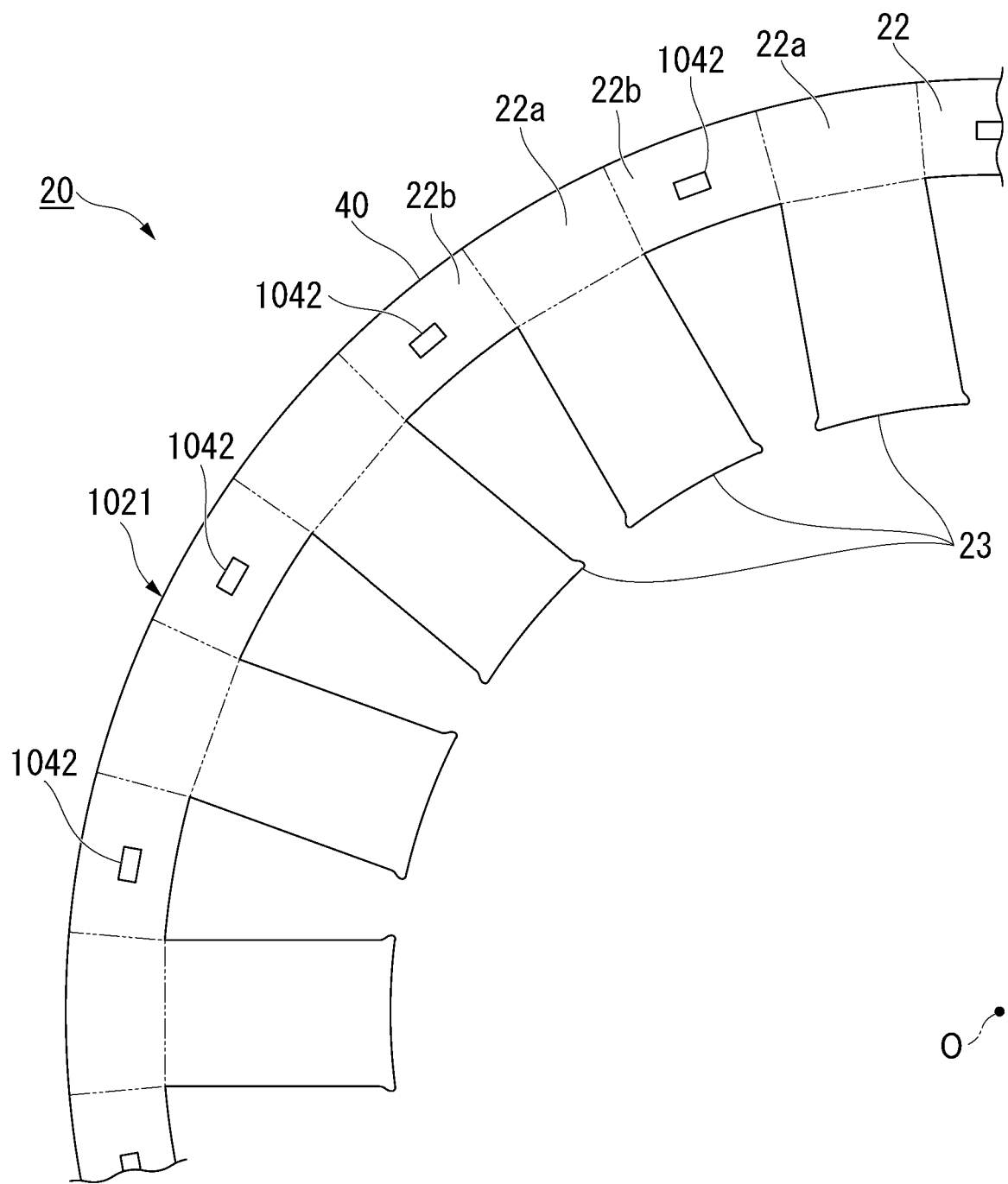
FIG. 11 is a schematic diagram of a stator core of a model No. 4 as a comparative example.

The stator core 1021 of Model No. 4 is shown in FIG. 11. A stator core 1021 is formed by stacking the electrical steel sheets 40 having the same shape as that of the stator core 21 of the above-described embodiment in the thickness direction. The stator core 1021 is different from the stator core 21 of the above-described embodiment in that the electrical steel sheets 40 are fastened and fixed to each other. That is, the electrical steel sheets 40 of the stator core 1021 are fixed to each other by a fastening 1042 (a dowel). The fastening 1042 is located at the second portion 22b of the core back part 22.

Figure 10:
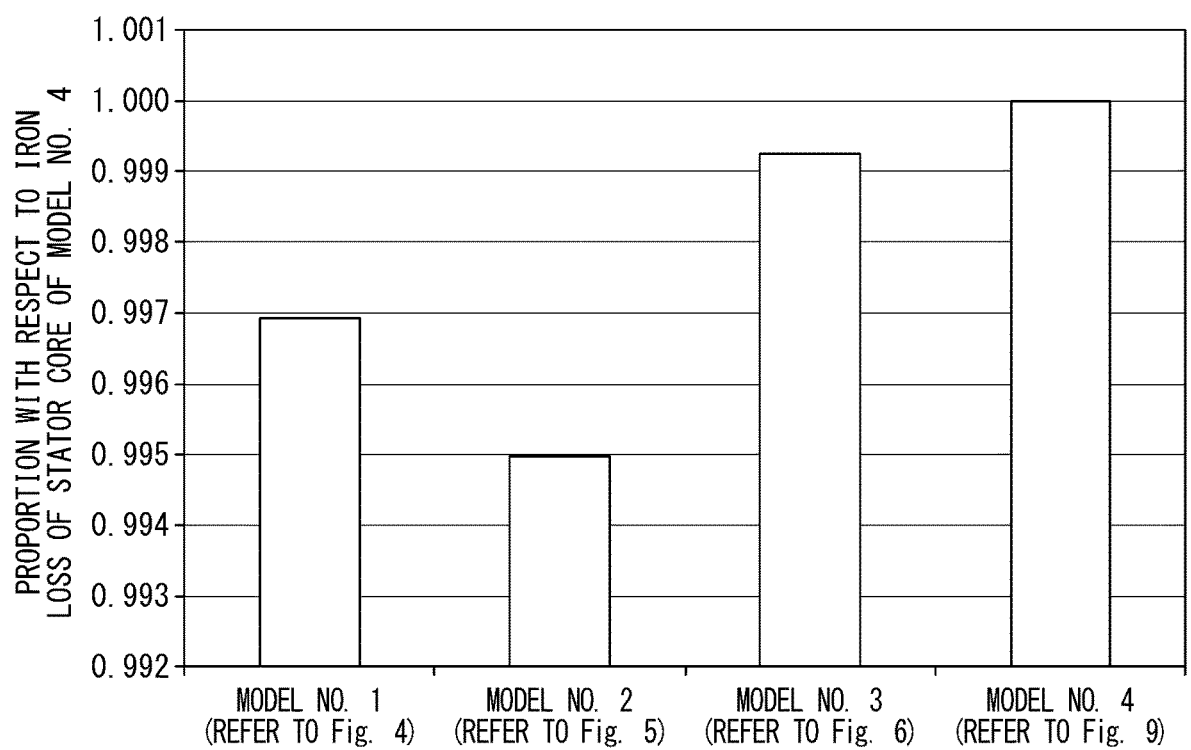
FIG. 10 is a graph showing simulation results of iron loss of a model No. 1 to a model No. 4.

FIG. 10 shows calculation results of the iron loss of the electrical steel sheet calculated by the simulation software for each of the models. Further, in the iron loss (a vertical axis) of the calculation result shown in FIG. 10, the iron loss of Model No. 4 is set to 1.0, and the iron loss of another model is indicated as a ratio with respect to the iron loss of Model No. 4.

As shown in FIG. 10, it was confirmed that the stator cores of Model No. 1 to Model No. 3 have smaller values of the iron loss than that of the stator core of Model No. 4.

The stator core of Model No. 3 has larger iron loss than those of the stator cores of Model No. 1 and Model No. 2. In the stator core of Model No. 3, as shown in FIG. 6, the adhesion region is located in the vicinity of a boundary between the tooth part and the core back part. Therefore, it is considered that the magnetic flux passing through the deterioration region due to the adhesion region increases and the magnetic resistance increases. Therefore, in the stator core of Model No. 3, as shown in FIG. 7, it is considered that the value of iron loss can be reduced by disposing the adhesion region unevenly outward of the core back part in the radial direction.

INDUSTRIAL APPLICABILITY

According to the present invention, it is possible to enhance the magnetic properties. Therefore, the industrial applicability is high.

BRIEF DESCRIPTION OF THE REFERENCE SYMBOLS

10 Electric motor
20 Stator
21 Stator core (laminated core)
22 Core back part
22a First portion
22b Second portion
23 Tooth part
40 Electrical steel sheet
41, 141, 241, 341, 441, 541 Adhesion part
42, 142, 242, 342, 442, 542 Adhesion region
43, 143, 243 Blank region
B Magnetic flux
CL Center line

The invention claimed is:

1. A laminated core comprising:
a plurality of electrical steel sheets stacked on each other; and
an adhesion part which is provided between the electrical steel sheets adjacent to each other in a stacking direction and on a surface of the electrical steel sheet which is directed in the stacking direction and adheres the electrical steel sheets to each other,
wherein the electrical steel sheet includes,
an annular core back part, and
a plurality of tooth parts which extend from the core back part in a radial direction of the core back part and are disposed at intervals in a circumferential direction of the core back part,
an adhesion region in which the adhesion part is provided is formed in the core back part of the electrical steel sheet,
the adhesion region extends in a direction along a magnetic flux passing through a region of the electrical steel sheet in contact with the adhesion region,
the core back part has a first portion and a second portion which are alternately arranged in the circumferential direction,
the first portion is radially connected to the tooth part outside the tooth part in the radial direction,
the second portion is located between the first portions in the circumferential direction, and
the adhesion region is formed in one of the first portion and the second portion,
wherein a boundary line between the first portion and the second portion coincides with an imaginary straight line extending in the radial direction through the annular core back part from an end of the tooth part in the circumferential direction at a connection part between the first portion and the tooth part continuous in the radial direction, and the adhesion region is formed in only one of the first portion and the second portion.

2. The laminated core according to claim 1,
wherein in the first portion or the second portion in which the adhesion region is provided,
blank regions in which the adhesion region is not formed are disposed on both sides of the adhesion region in the circumferential direction and both sides of the adhesion region in the radial direction.

3. The laminated core according to claim 1,
wherein the adhesion region is formed in the first portion, and
the adhesion region is not formed on both sides of the adhesion region in the circumferential direction.

4. The laminated core according to claim 3, wherein the adhesion region extends along a center line of the tooth part in the radial direction.

5. The laminated core according to claim 4, wherein:
the tooth part extends inward from the core back part in the radial direction,
the adhesion region extends radially inward from an outer end of the core back part in the radial direction, and
an inner end portion of the adhesion region in the radial direction is located radially outward from an inner end of the core back part in the radial direction.

6. The laminated core according to claim 3, wherein:
the tooth part extends inward from the core back part in the radial direction,
the adhesion region extends radially inward from an outer end of the core back part in the radial direction, and an inner end portion of the adhesion region in the radial direction is located radially outward from an inner end of the core back part in the radial direction.

7. The laminated core according to claim 1, wherein:
the adhesion region is provided in the second portion, and
the adhesion region is not formed on both sides of the adhesion region in the radial direction.

8. The laminated core according to claim 7, wherein the adhesion region extends in the circumferential direction.

9. The laminated core according to claim 8, wherein:
the tooth part extends inward from the core back part in the radial direction, and
the adhesion region is unevenly disposed outward of the core back part in the radial direction.

10. The laminated core according to claim 7, wherein:
the tooth part extends inward from the core back part in the radial direction, and
the adhesion region is unevenly disposed outward of the core back part in the radial direction.

11. The laminated core according to claim 1, wherein an average thickness of the adhesion part is 1.0 μm to 3.0 μm.

12. The laminated core according to claim 1, wherein an average tensile modulus of elasticity E of the adhesion part is 1500 MPa to 4500 MPa.

13. The laminated core according to claim 1, wherein the adhesion part is a room temperature adhesion type acrylic-based adhesive containing second generation acrylic adhesive made of an elastomer-containing acrylic-based adhesive.

14. An electric motor including the laminated core according to claim 1.

* * * * *